(No Model.)
L. SMITH.
ECCENTRIC SHAPED FILTER.
No. 290,364. Patented Dec. 18, 1883.
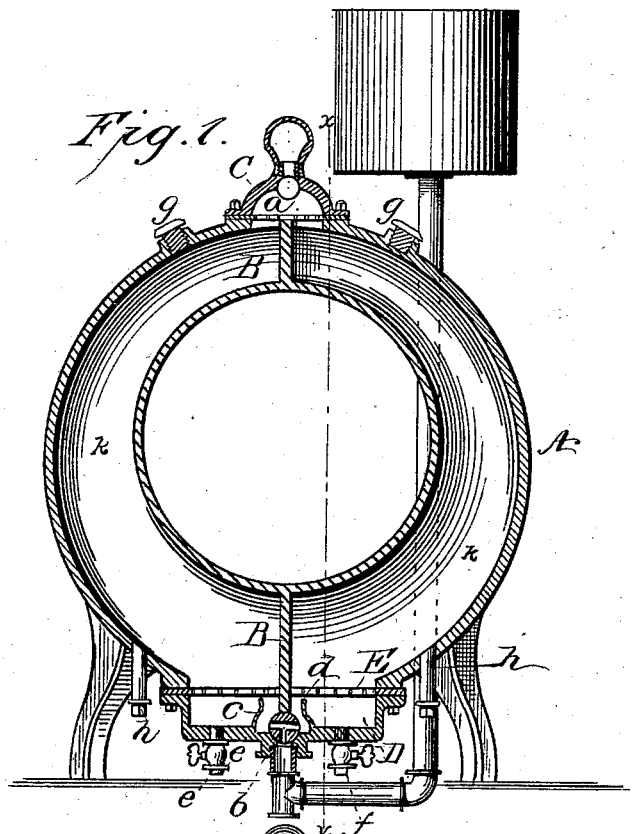

UNITED STATES PATENT OFFICE.

LYMAN SMITH, OF KANSAS CITY, MISSOURI.

ECCENTRIC-SHAPED FILTER.

SPECIFICATION forming part of Letters Patent No. 290,364, dated December 18, 1883.

Application filed April 27, 1883. (No model.)

*To all whom it may concern:*

Be it known that I, LYMAN SMITH, of Kansas City, in the State of Missouri, have invented certain new and useful Improvements in Eccentric-Shaped Filters; and I do hereby declare that the following is a full, clear, and exact description of the invention, which will enable others skilled in the art to which it appertains to make and use the same, reference being had to the accompanying drawings, and to the letters of reference thereon, which form part of this specification.

The object of this invention is to improve, simplify, and cheapen the construction of double-chambered filters, in which the water or other liquid is forced upward through sand or other filtering material. These filters may be made of suitable sizes for housekeepers, hotels, and for other purposes.

The filter is made eccentric in shape, having an annular space increasing in diameter, and is centrally and vertically divided by a diaphragm cast therein, and is an improvement upon Patent No. 268,304, granted to me November 28, 1882.

The present invention consists in forming chambers at top and bottom of the filter, and providing said chambers with reticulated screens, which extend each side of the diaphragm and between the inlets and outlets of the filter and its chambers, and in providing the lower chamber with a mud-partition, which prevents the sedimentary deposits from coming in contact with the incoming water, all of which will be more fully hereinafter described.

Referring more particularly to the accompanying drawings hereto annexed, Figure 1 illustrates a diametric section taken on a line flatwise through the double-chambered filter constructed according to my improvements. Fig. 2 is a vertical section taken on the line $xx$, Fig. 1.

A is the body of the filter, and B the division-plate or diaphragm which divides it into separate compartments $k\ k$. C is the upper escape-chamber, and $a$ its perforated plate. In the upper part of the discharge-chamber I locate a draw-off valve, and over it an air-chamber, which makes quite a nice finish. At the bottom of the filter is located the inlet-valve $b$, around which are placed deflectors $c\ d$. These latter parts are placed and secured to the walls of chamber D, which is secured to the body of the filter, and between the flanges of chamber D and the shell of the filter is located a perforated diaphragm, E, which intercepts any coarse matter which would otherwise enter the filter with the water on either side of the deflecting-plate and with the walls of chamber D, and under the perforated plate is a mud or sediment collecting chamber, which mud deposits itself after being separated from the water. This mud may be blown off from time to time, as occasion may require, through the small cocks $e\ f$. The mud in the chamber D is also prevented from coming in contact with the incoming water, as hereinbefore described. The water entering through the valve is directed by means of the deflectors $c\ d$ against the lower side of the screen E, and by its impact washes off any mud or scale that fastens itself thereto.

When the filter is to be used in country places where there is no force of water, I provide a tank sufficiently high to cause the water to rise and flow through the filter; but of course this is not essential where there are hydrants that will furnish a sufficient supply.

This filter is cast in a single piece. The core-sand can readily be cleaned out through the openings left for various purposes.

The filter is provided with legs, which are cast with the body. The three-way cock $b$ performs the function of feeding from either side of the filter, or to both sides, as may be desired, and the water entering therethrough is prevented from coming in contact with the mud in the side chamber. The upper and lower perforated diaphragms, it is evident, prevent the filtering material either from falling through at the bottom or passing over with the water at the top, and when the filter is to be filled with filtering material it may be done so through the hand-holes $g\ g$, and taken out through short pipes $h\ h$.

When either of the sides of the filter is to be cleaned, all the filtered water may be passed down through the filtering material, thus entirely and effectually carrying all the sediment or mud with it.

Having described my invention, what I claim is—

1. The combination, with an eccentric-shaped cylinder provided with the division-plate B, of the upper and lower screened chambers, C and D, and the three-way controlling-valve, whereby the water entering the filter may be directed to either or both sides of the division-plate, for the purpose set forth.

2. The filter A, divided into separate compartments $k$ by division-plates B, in combination with the upper escape-chamber divided from the main compartments by perforated plate $a$, the lower chamber, D, divided from said compartments by screening-partition E, the supply-pipe communicating with said lower chamber, which is provided with a three-way valve, and the deflecting-plates $c\ d$, located in the chamber at each side of the valve, the whole to operate as set forth.

3. The filter A, divided into separate compartments, as described, in combination with the screen E, mud-chamber D, deflectors $c\ d$, and cock $e\ f$, whereby the mud can be blown out, as occasion may require, substantially as set forth.

In testimony that I claim the foregoing as my own invention I affix my signature in presence of two witnesses.

LYMAN SMITH.

Witnesses:
B. F. MORSELL,
EDWARD E. ELLIS.